US008977616B2

(12) United States Patent
MacMillan et al.

(10) Patent No.: US 8,977,616 B2
(45) Date of Patent: Mar. 10, 2015

(54) METHODS, APPARATUSES AND COMPUTER PROGRAM PRODUCTS FOR GENERATING INDEXES USING A JOURNAL IN A KEY VALUE MEMORY DEVICE

(75) Inventors: David Gordon MacMillan, Burlington, MA (US); Matti Juhani Oikarinen, Wilmington, MA (US)

(73) Assignee: Nokia Corporation, Espoo (FI)

( * ) Notice: Subject to any disclaimer, the term of this patent is extended or adjusted under 35 U.S.C. 154(b) by 322 days.

(21) Appl. No.: 13/300,008

(22) Filed: Nov. 18, 2011

(65) Prior Publication Data
US 2013/0132397 A1    May 23, 2013

(51) Int. Cl.
*G06F 17/30* (2006.01)

(52) U.S. Cl.
CPC ............................. *G06F 17/30336* (2013.01)
USPC .......................................... 707/736; 707/741

(58) Field of Classification Search
None
See application file for complete search history.

(56) References Cited

U.S. PATENT DOCUMENTS

| | | | | |
|---|---|---|---|---|
| 7,840,774 | B2* | 11/2010 | Berger et al. | 711/171 |
| 2003/0135495 | A1* | 7/2003 | Vagnozzi | 707/3 |
| 2004/0139070 | A1* | 7/2004 | Dysart et al. | 707/3 |
| 2006/0287978 | A1* | 12/2006 | Cunningham | 707/2 |
| 2007/0055647 | A1* | 3/2007 | Mullins et al. | 707/2 |
| 2010/0306222 | A1* | 12/2010 | Freedman et al. | 707/759 |

OTHER PUBLICATIONS

Oracle 8i DBA Handbook, by the McGraw-Hill, copyright 2000, p. 11.*
Li, et al., "Leveraging a Scalable Row Store to build a Distributed Text Index, "White Paper presented at Cloud DB '09, Nov. 6, 2009, Hong Kong, China, 7 pages, downloaded from http://www.almaden.ibm.com/cs/projects/clouddb/hindex.pdf.
"Apache Solr," Web brochure, copyright 2011, 4 pages, downloaded as early as Nov. 18, 2011 from http://lucene.apache.org/solr.

* cited by examiner

Primary Examiner — Wilson Lee
(74) Attorney, Agent, or Firm — Alston & Bird LLP

(57) ABSTRACT

An apparatus for generating indexes of data may include a processor and memory storing executable computer code causing the apparatus to at least perform operations including obtaining an order number responsive to receipt of a request from a device to index an item(s) of data. The computer program code may further cause the apparatus to map the order number to a key value and link the key value to the data and provide one or more index entries to a memory device to enable storage of the index entries. The index entries may include information corresponding to the key value and the data. The computer program code may further cause the apparatus to assign a new index row(s) including the data for inclusion in a set of index rows of a designated partition(s) to obtain a built index(es) of the data. Corresponding methods and computer program products are also provided.

20 Claims, 10 Drawing Sheets

METHODS, APPARATUSES AND COMPUTER PROGRAM PRODUCTS FOR GENERATING INDEXES USING A JOURNAL IN A KEY VALUE MEMORY DEVICE

TECHNOLOGICAL FIELD

An example embodiment of the invention relates generally to indexing management and more particularly, relates to a method, apparatus, and computer program product for generating one or more indexes.

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users. Due to the now ubiquitous nature of electronic communication devices, people of all ages and education levels are utilizing electronic devices to communicate with other individuals or contacts, receive services and/or share information, media and other content. One area in which there is a demand to increase ease of information transfer relates to efficient and reliable indexing of databases. In this regard, database indexing may improve speed of data retrieval from a database and may result in increased storage space.

However, as scale increases, for example, the number of rows of a database, it may become necessary to partition indexes, both to maintain query performance and to accommodate the limitations of individual physical storage systems. At present, building reliable partitioned indexes in the presence of concurrent updates of data may present challenges. For instance, currently concurrency problems may be solved by having a single process control an index build. However, this may impose severe limitations on throughput and high latency for index build requests.

Additionally, presently, indexes are typically difficult to scale up and difficult to distribute. For example, adding multisite replication, scalability, performance, reliability and other requirements may make the indexing even more difficult to achieve.

In view of the foregoing drawbacks, it may be beneficial to provide an efficient and reliable mechanism of generating highly scalable, reliable and multisite capable indexes.

BRIEF SUMMARY

A method, apparatus and computer program product are therefore provided for enabling provision of an efficient and reliable mechanism of generating one or more indexes for inclusion of data. In this regard, an example embodiment may create highly scalable, reliable, multistate capable indexes based in part on utilizing data of a journal(s) in a reliable memory device (e.g., a key value storage device).

Additionally, some example embodiments may, but need not, split one or more indexes across multiple devices which may utilize the data of the journal(s) and data of the memory device (e.g., a key value database) to generate one or more new indexes or to add one or more index rows to the existing indexes.

In this regard, a communication device (e.g., a network device) may write data to be indexed to the journal(s) of a reliable memory device (e.g., the key value database (also referred to herein as a key value store)) and one or more devices may utilize the data of the journal and other data of the memory device to build one or more indexes. As such, an example embodiment may enable any suitable number of indexes to be run or executed. Moreover, in an example embodiment, one or more indexes may be partitioned to utilize N journals, and the N journals may be distributed via a memory (e.g., a storage unit) to M sites. For example, the data in any one journal may be 'logically partitioned' by means of the format of the keys. Journals may also be replicated to different sites. Indexes may be built on each site according to a partitioning strategy encoded in the journal's keys.

In one example embodiment, a method for generating indexes of data is provided. The method may include obtaining an order number in response to receipt of a request from a first device to index one or more items of data and mapping the order number to a key value and linking the key value to the data. The method may further include enabling provision of one or more index entries to a memory device to enable storage of the index entries. The index entries may include information corresponding to the key value and the data. The method may further include assigning at least one new index row including the data for inclusion in a set of index rows of at least one designated partition to obtain at least one built index of the data.

In another example embodiment, an apparatus for generating indexes of data is provided. The apparatus may include a processor and a memory including computer program code. The memory and the computer program code are configured to, with the processor, cause the apparatus to at least perform operations including obtaining an order number in response to receipt of a request from a first device to index one or more items of data and mapping the order number to a key value and linking the key value to the data. The memory and the computer program code may further cause the apparatus to enable provision of one or more index entries to a memory device to enable storage of the index entries. The index entries may include information corresponding to the key value and the data. The memory and the computer program code may further cause the apparatus to assign at least one new index row including the data for inclusion in a set of index rows of at least one designated partition to obtain at least one built index of the data.

In another example embodiment, a computer program product for generating indexes of data is provided. The computer program product includes at least one computer-readable storage medium having computer-executable program code instructions stored therein. The computer executable program code instructions may include program code instructions configured to obtain an order number in response to receipt of a request from a first device to index one or more items of data and map the order number to a key value and link the key value to the data. The program code instructions may also enable provision of one or more index entries to a memory device to enable storage of the index entries. The index entries may include information corresponding to the key value and the data. The program code instructions may also assign at least one new index row including the data for inclusion in a set of index rows of at least one designated partition to obtain at least one built index of the data.

An example embodiment of the invention may provide a better mechanism for generating one or more indexes in a reliable and highly scalable manner. As such, device users may enjoy improved capabilities with respect to indexing of data and for retrieving the data from one or more generated indexes.

BRIEF DESCRIPTION OF THE SEVERAL VIEWS OF THE DRAWINGS

Figure 1:
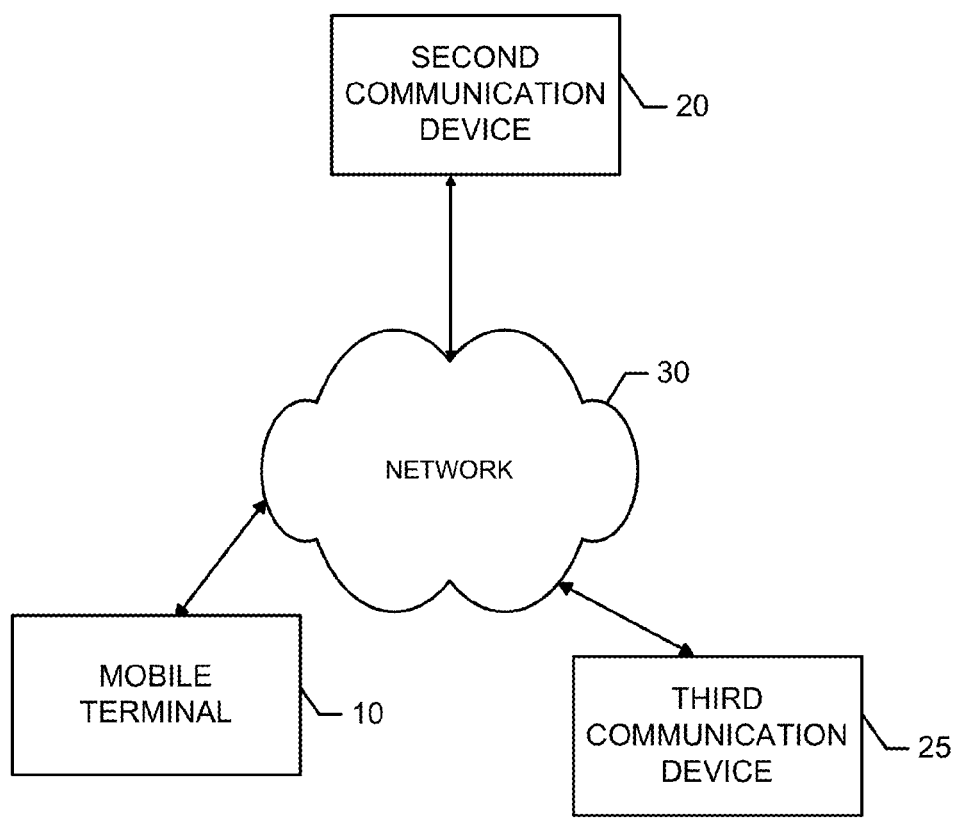
Figure 2:
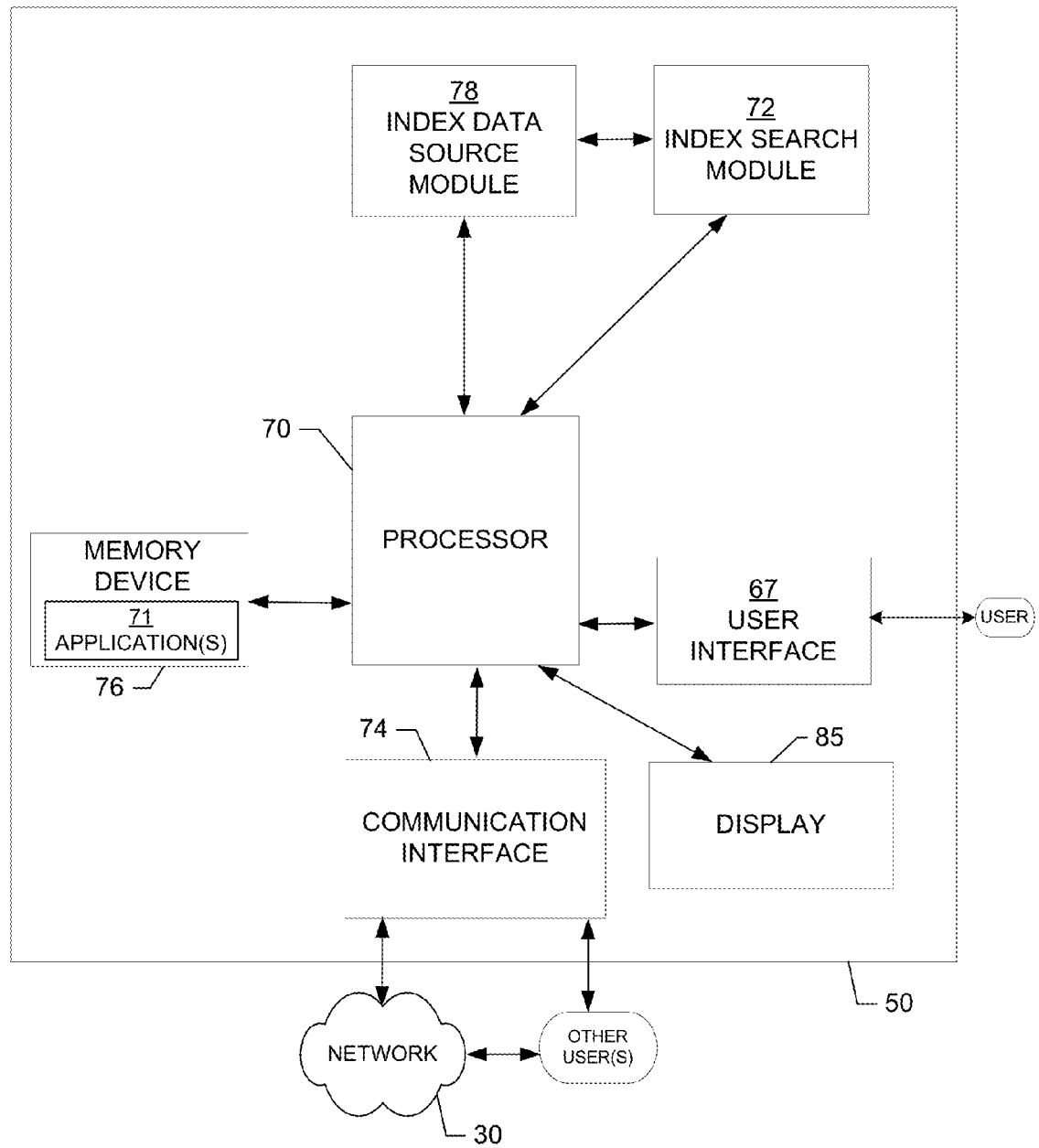
Figure 3:
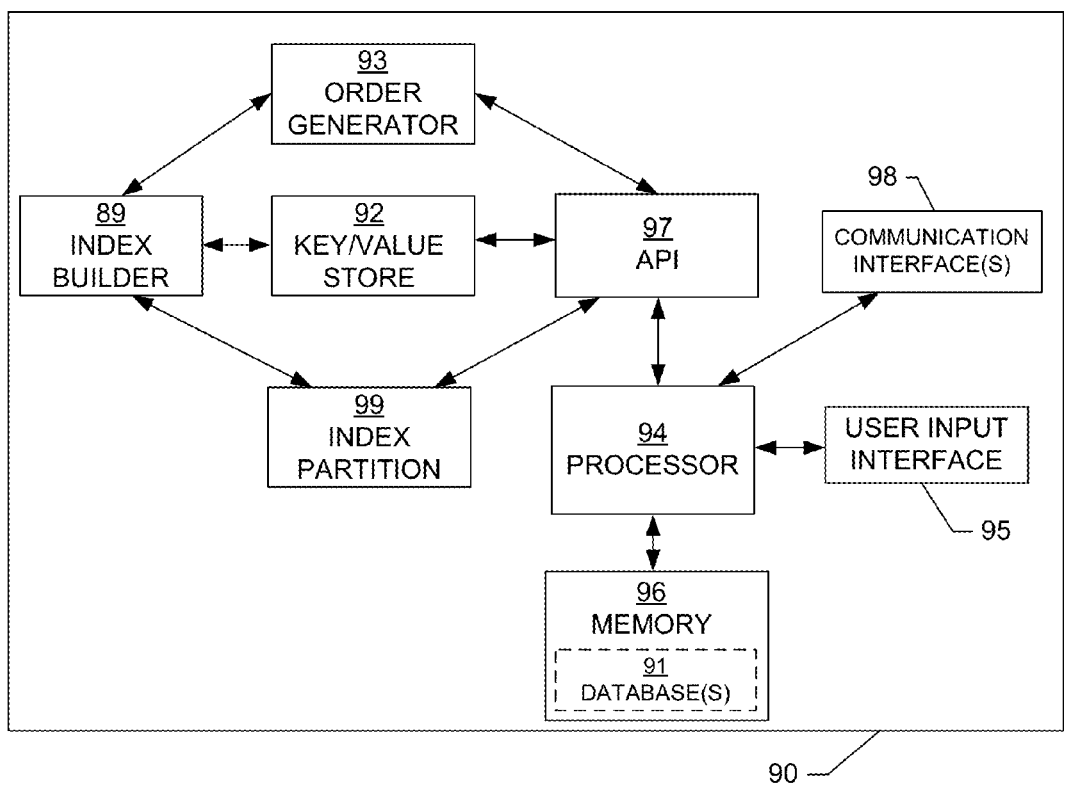
Figure 4:
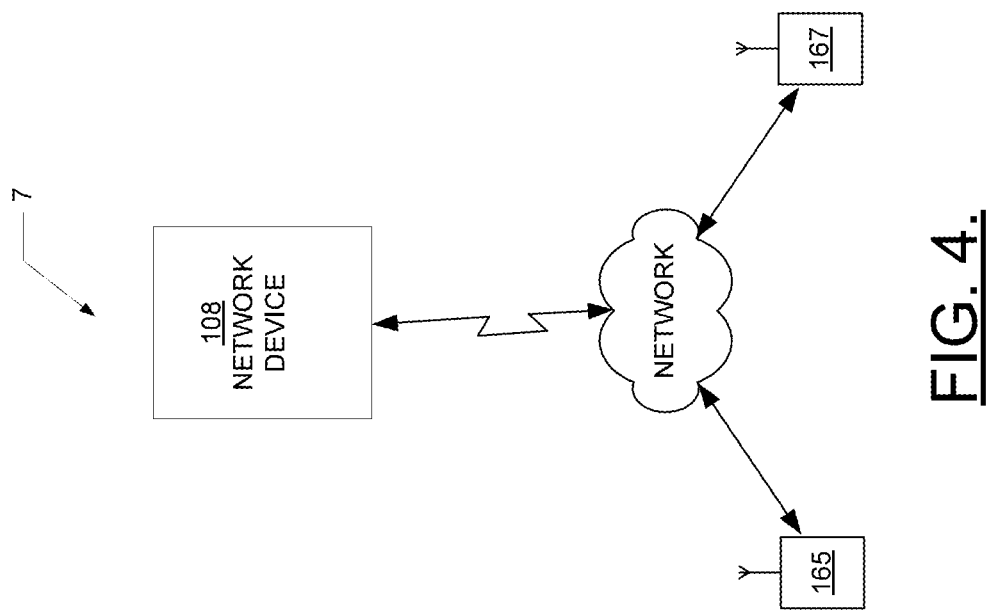
Figure 5:
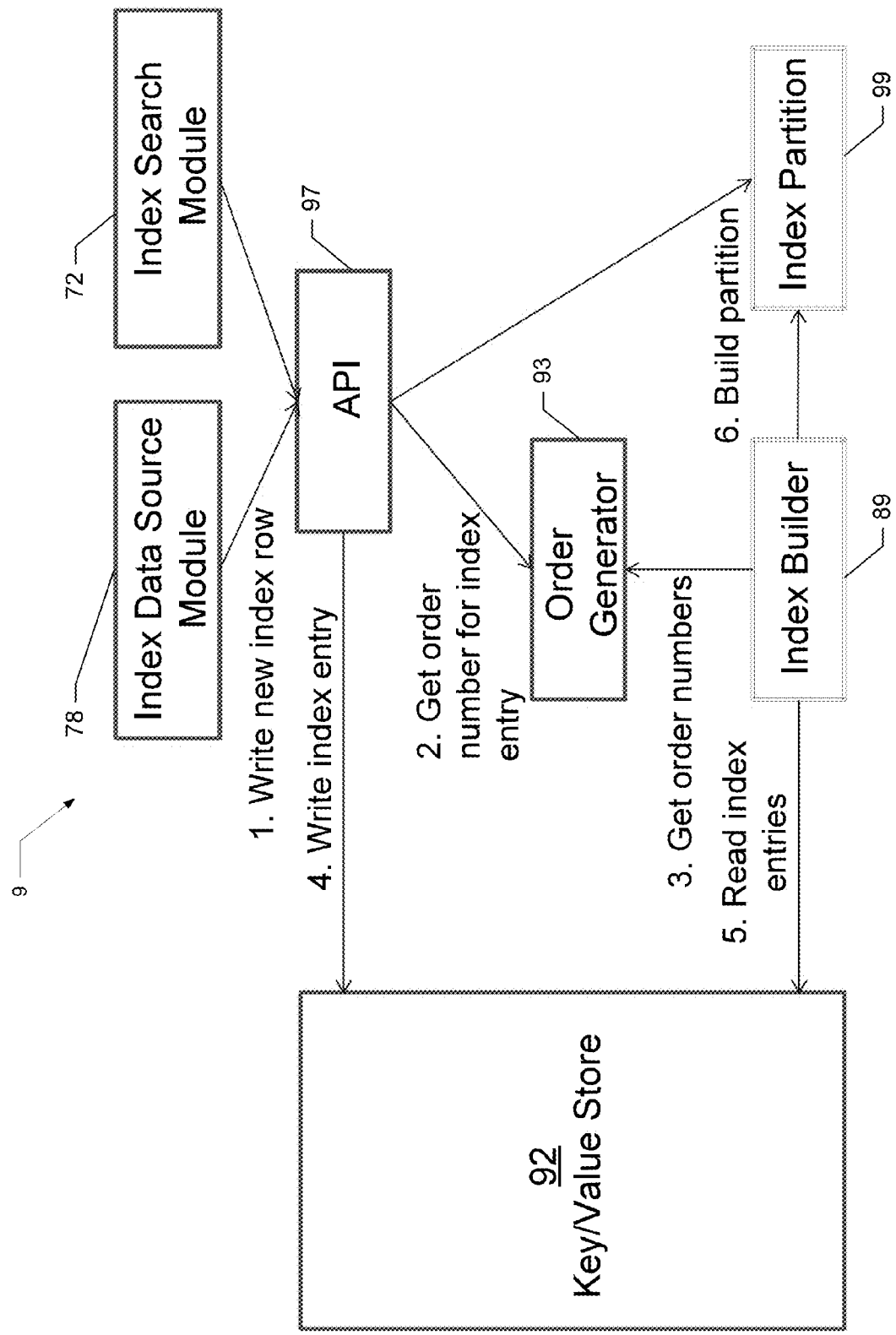
Figure 6:
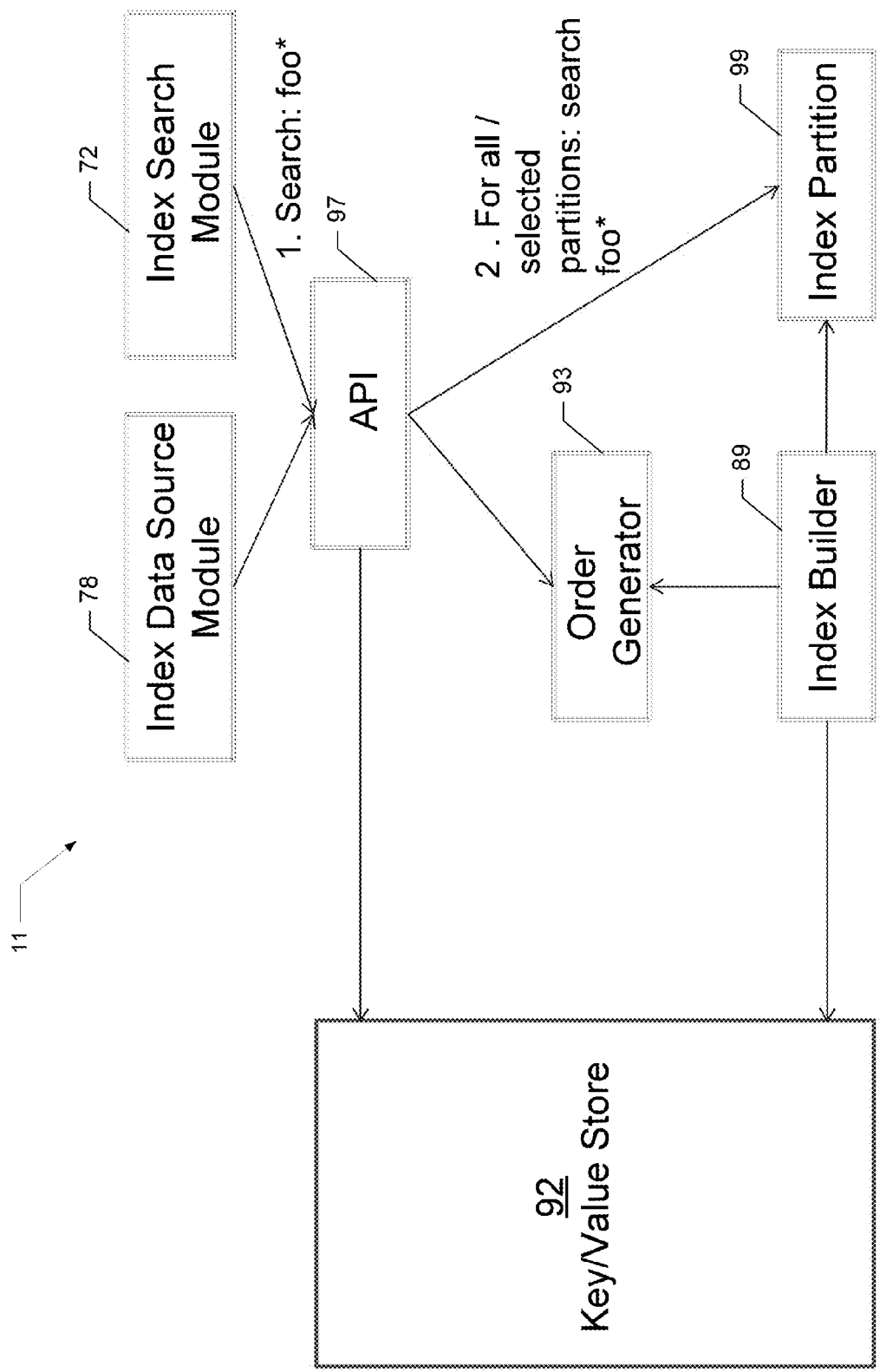
Figure 7:
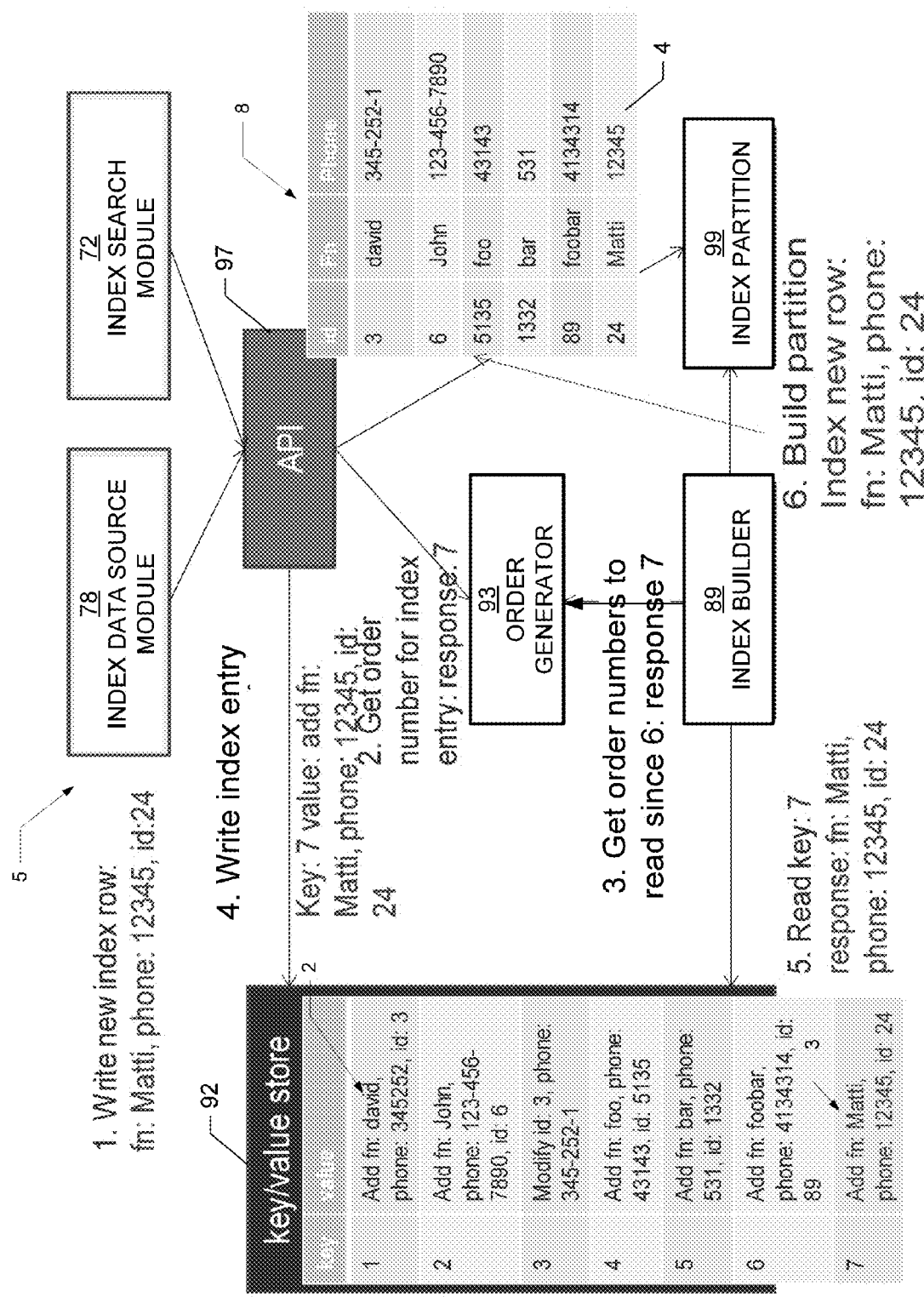
Figure 8:
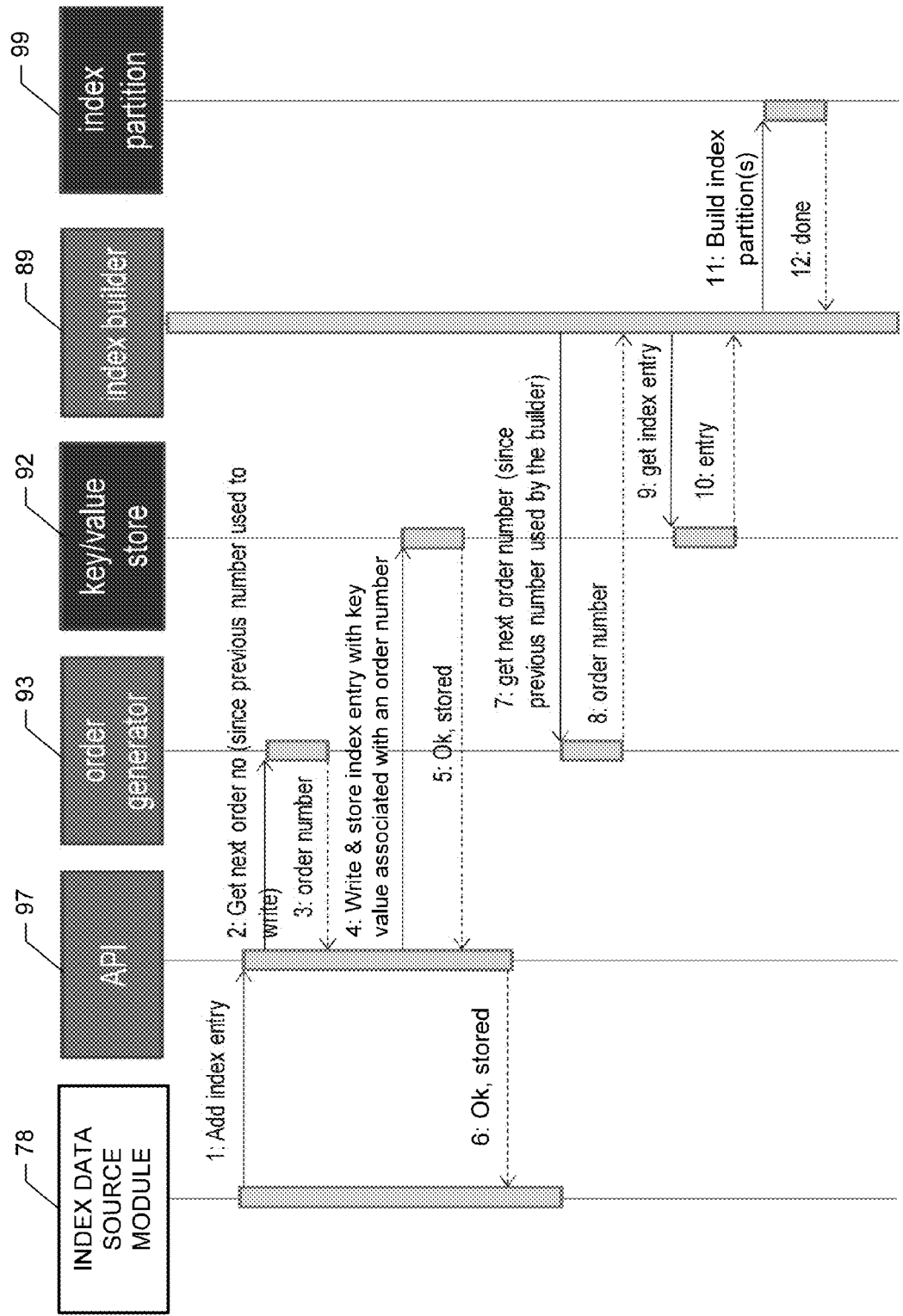
Figure 9:
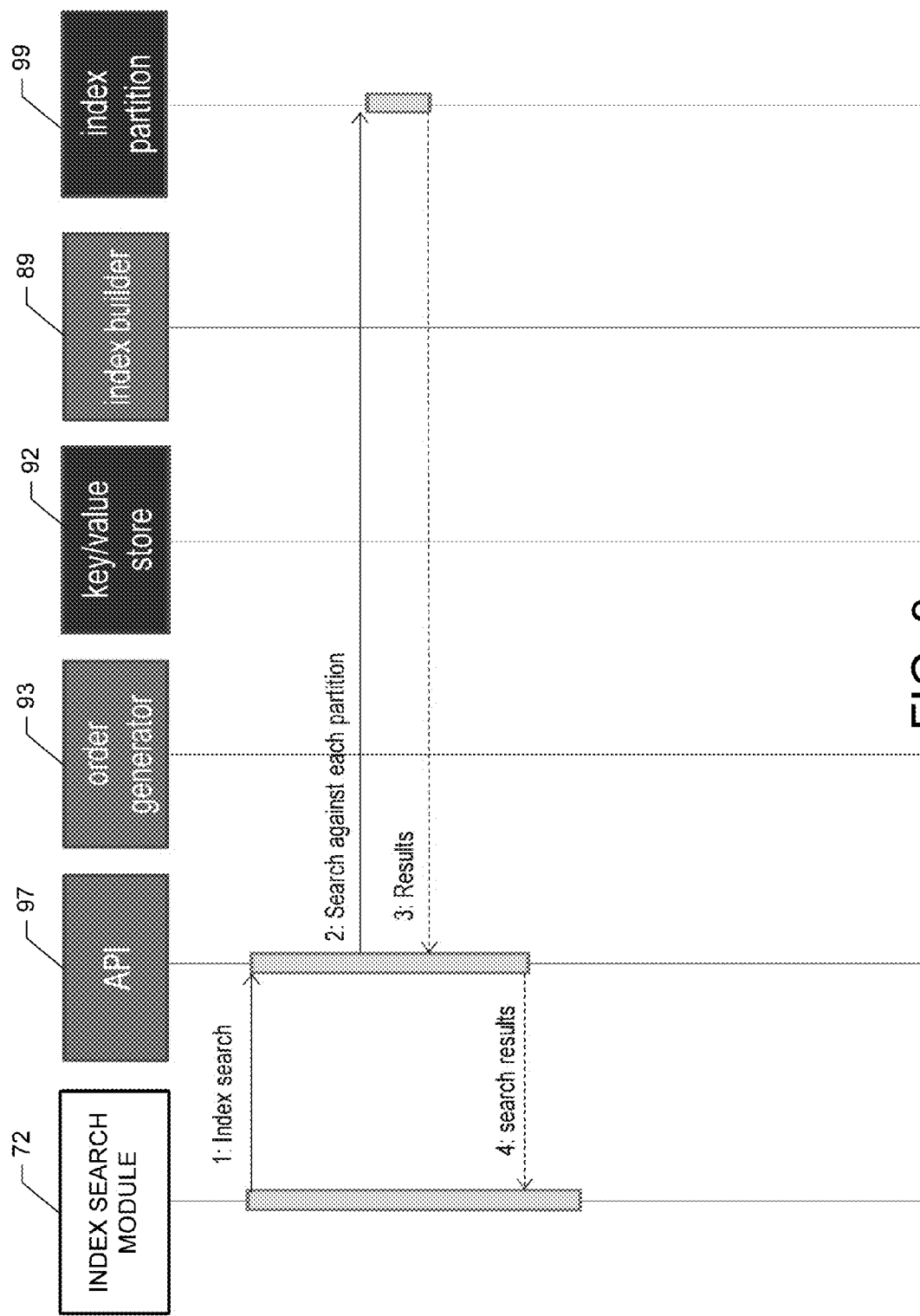
Figure 10:
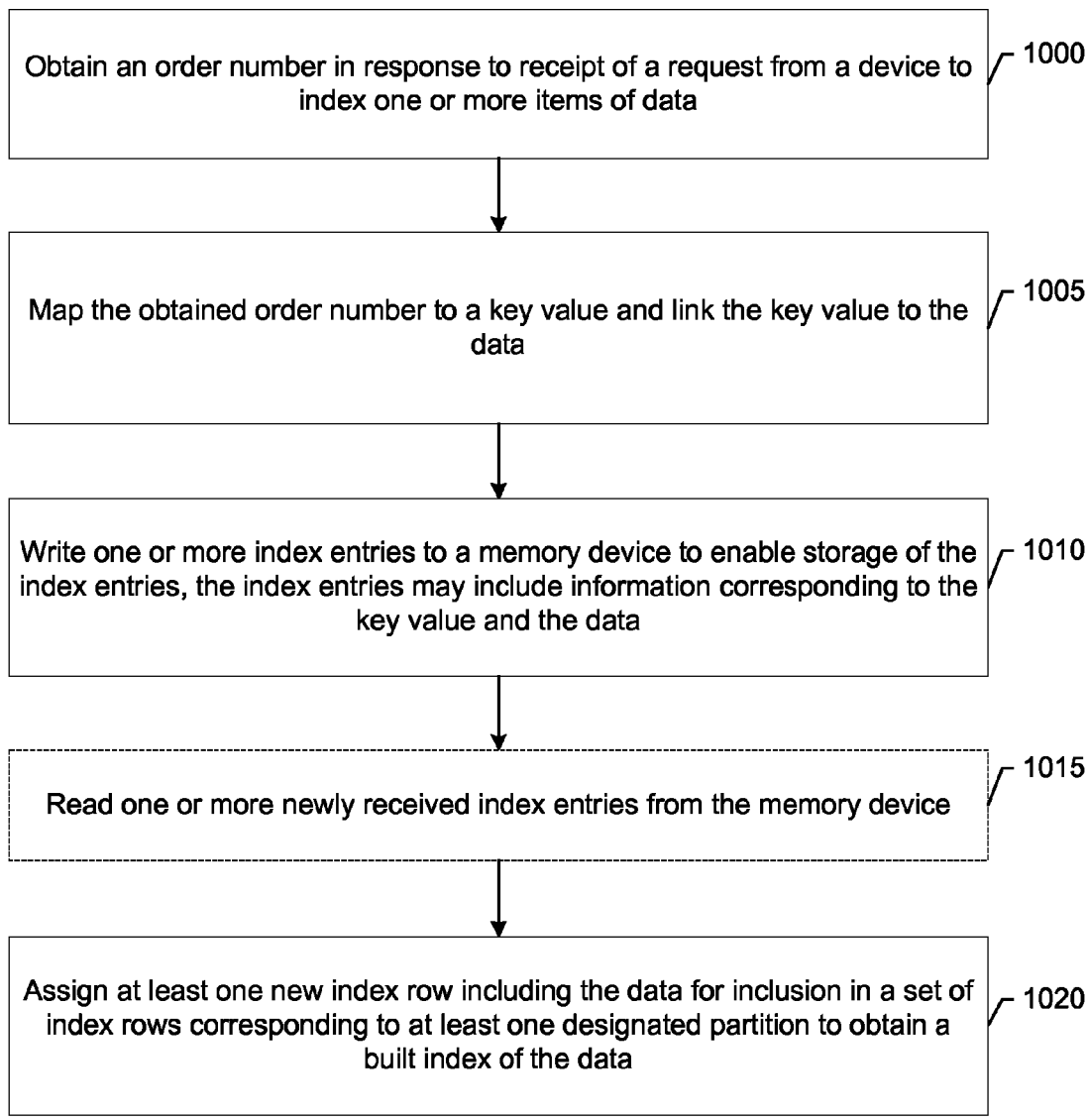

Having thus described the invention in general terms, reference will now be made to the accompanying drawings, which are not necessarily drawn to scale, and wherein:

FIG. 1 is a schematic block diagram of a system that may include an example embodiment of the invention;

FIG. 2 is a schematic block diagram of an apparatus according to an example embodiment of the invention;

FIG. 3 is a schematic block diagram of a network device for indexing data according to an example embodiment of the invention;

FIG. 4 is a block diagram of a system according to an example embodiment of the invention;

FIG. 5 is a block diagram of a system for generating one or more indexes according to an example embodiment;

FIG. 6 is a block diagram of a system for searching one or more items of indexed data according to an example embodiment;

FIG. 7 is another block diagram of a system for generating one or more indexes according to an example embodiment;

FIG. 8 is a signal flow diagram for generating one or more indexes according to an example embodiment;

FIG. 9 is a signal flow diagram for searching one or more items of indexed data according to an example embodiment; and FIG. 10 illustrates a flowchart for generating one or more indexes according to an example embodiment of the invention.

DETAILED DESCRIPTION

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein. Like reference numerals refer to like elements throughout. As used herein, the terms "data," "content," "information" and similar terms may be used interchangeably to refer to data capable of being transmitted, received and/or stored in accordance with embodiments of the present invention. Moreover, the term "exemplary", as used herein, is not provided to convey any qualitative assessment, but instead merely to convey an illustration of an example. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein a "computer-readable storage medium," which refers to a non-transitory, physical or tangible storage medium (e.g., volatile or non-volatile memory device), may be differentiated from a "computer-readable transmission medium," which refers to an electromagnetic signal.

As referred to herein, a journal(s) may be a chronological record(s) of one or more data processing operations that may be utilized, in part, to construct, build, generate or restore a one or more indexes. The one or more indexes may be stored within one or more memories, one or more databases, one or more computer system(s), one or more computer files, or the like.

As referred to herein, a "partition(s)," "partitioning" or the like may relate to a division of a memory device(s), a database(s), or the like or a division of data, content, information or the like of a memory device(s), a database(s), or other memory element(s), into distinct parts for storage of data (e.g., a predetermined amount or predetermined allocation of data).

FIG. 1 illustrates a generic system diagram in which a device such as a mobile terminal 10 is shown in an example communication environment. As shown in FIG. 1, an embodiment of a system in accordance with an example embodiment of the invention may include a first communication device (e.g., mobile terminal 10) and a second communication device 20 capable of communication with each other via a network 30. In some cases, an embodiment of the present invention may further include one or more additional communication devices, one of which is depicted in FIG. 1 as a third communication device 25. In one embodiment, not all systems that employ an embodiment of the present invention may comprise all the devices illustrated and/or described herein. While an embodiment of the mobile terminal 10 and/or second and third communication devices 20 and 25 may be illustrated and hereinafter described for purposes of example, other types of terminals, such as portable digital assistants (PDAs), pagers, mobile televisions, mobile telephones, gaming devices, laptop computers, cameras, video recorders, audio/video players, radios, global positioning system (GPS) devices, Bluetooth headsets, Universal Serial Bus (USB) devices or any combination of the aforementioned, and other types of voice and text communications systems, can readily employ an embodiment of the present invention. Furthermore, devices that are not mobile, such as servers and personal computers may also readily employ an embodiment of the present invention.

The network 30 may include a collection of various different nodes (of which the second and third communication devices 20 and 25 may be examples), devices or functions that may be in communication with each other via corresponding wired and/or wireless interfaces. As such, the illustration of FIG. 1 should be understood to be an example of a broad view of certain elements of the system and not an all inclusive or detailed view of the system or the network 30. Although not necessary, in one embodiment, the network 30 may be capable of supporting communication in accordance with any one or more of a number of First-Generation (1G), Second-Generation (2G), 2.5G, Third-Generation (3G), 3.5G, 3.9G, Fourth-Generation (4G) mobile communication protocols, Long Term Evolution (LTE) or Evolved Universal Terrestrial Radio Access Network (E-UTRAN), Self Optimizing/Organizing Network (SON) intra-LTE, inter-Radio Access Technology (RAT) Network and/or the like. In one embodiment, the network 30 may be a point-to-point (P2P) network.

One or more communication terminals such as the mobile terminal 10 and the second and third communication devices 20 and 25 may be in communication with each other via the network 30 and each may include an antenna or antennas for transmitting signals to and for receiving signals from one or more base sites. The base sites could be, for example one or more base stations (BS) that is a part of one or more cellular or mobile networks or one or more access points (APs) that may be coupled to a data network, such as a Local Area Network (LAN), Wireless Local Area Network (WLAN), a Metropolitan Area Network (MAN), and/or a Wide Area Network (WAN), such as the Internet. In turn, other devices such as processing elements (e.g., personal computers, server computers or the like) may be coupled to the mobile terminal 10 and the second and third communication devices 20 and 25 via the network 30. By directly or indirectly connecting the mobile terminal 10 and the second and third communication devices 20 and 25 (and/or other devices) to the network 30, the mobile terminal 10 and the second and third communication devices 20 and 25 may be enabled to communicate with the other devices or each other. For example, the mobile terminal 10 and the second and third communication devices 20 and 25 as well as other devices may communicate according to numerous communication protocols including Hypertext Transfer Protocol (HTTP) and/or the like, to thereby carry out various communication or other functions of the mobile terminal 10 and the second and third communication devices 20 and 25, respectively.

Furthermore, although not shown in FIG. 1, the mobile terminal 10 and the second and third communication devices 20 and 25 may communicate in accordance with, for example, Radio Frequency (RF), Near Field Communication (NFC), Bluetooth (BT), Infrared (IR) or any of a number of different wireline or wireless communication techniques, including Local Area Network (LAN), Wireless LAN (WLAN), Worldwide Interoperability for Microwave Access (WiMAX), Wireless Fidelity (Wi-Fi), Ultra-Wide Band (UWB), Wibree techniques and/or the like. As such, the mobile terminal 10 and the second and third communication devices 20 and 25 may be enabled to communicate with the network 30 and each other by any of numerous different access mechanisms. For example, mobile access mechanisms such as Wideband Code Division Multiple Access (W-CDMA), CDMA2000, Global System for Mobile communications (GSM), General Packet Radio Service (GPRS) and/or the like may be supported as well as wireless access mechanisms such as WLAN, WiMAX, and/or the like and fixed access mechanisms such as Digital Subscriber Line (DSL), cable modems, Ethernet and/or the like.

In an example embodiment, the first communication device (e.g., the mobile terminal 10) may be a mobile communication device such as, for example, a wireless telephone or other devices such as a personal digital assistant (PDA), mobile computing device, camera, video recorder, audio/video player, positioning device, game device, television device, radio device, or various other like devices or combinations thereof. The second communication device 20 and the third communication device 25 may be mobile or fixed communication devices. However, in one example, the second communication device 20 and the third communication device 25 (e.g., network device 90 of FIG. 3) may be servers, remote computers or terminals such as personal computers (PCs) or laptop computers.

In an example embodiment, the network 30 may be an ad hoc or distributed network arranged to be a smart space. Thus, devices may enter and/or leave the network 30 and the devices of the network 30 may be capable of adjusting operations based on the entrance and/or exit of other devices to account for the addition or subtraction of respective devices or nodes and their corresponding capabilities.

In an example embodiment, the mobile terminal as well as the second and third communication devices 20 and 25 may employ an apparatus (e.g., apparatus of FIG. 2) capable of employing an embodiment of the invention.

FIG. 2 illustrates a schematic block diagram of an apparatus according to an example embodiment. An example embodiment of the invention will now be described with reference to FIG. 2, in which certain elements of an apparatus 50 are displayed. The apparatus 50 of FIG. 2 may be employed, for example, on the mobile terminal 10 (and/or the second communication device 20 or the third communication device 25). Alternatively, the apparatus 50 may be embodied on a network device of the network 30. However, the apparatus 50 may alternatively be embodied at a variety of other devices, both mobile and fixed (such as, for example, any of the devices listed above). In some cases, an embodiment may be employed on a combination of devices. Accordingly, one embodiment of the invention may be embodied wholly at a single device (e.g., the mobile terminal 10), by a plurality of devices in a distributed fashion (e.g., on one or a plurality of devices in a P2P network) or by devices in a client/server relationship. Furthermore, it should be noted that the devices or elements described below may not be mandatory and thus some may be omitted in a certain embodiment.

Referring now to FIG. 2, the apparatus 50 may include or otherwise be in communication with a processor 70, a user interface 67, a communication interface 74, a memory device 76, a display 85, an index data source module 78 and an index search module 72. In one example embodiment, the display 85 may be a touch screen display. The memory device 76 may include, for example, volatile and/or non-volatile memory. For example, the memory device 76 may be an electronic storage device (e.g., a computer readable storage medium) comprising gates configured to store data (e.g., bits) that may be retrievable by a machine (e.g., a computing device like processor 70). In an example embodiment, the memory device 76 may be a tangible memory device that is not transitory. The memory device 76 may be configured to store information, data, files, applications, instructions or the like for enabling the apparatus to carry out various functions in accordance with an example embodiment of the invention. For example, the memory device 76 could be configured to buffer input data for processing by the processor 70. Additionally or alternatively, the memory device 76 could be configured to store instructions for execution by the processor 70. As yet another alternative, the memory device 76 may be one of a plurality of databases that store information and/or media content (e.g., pictures, videos, etc.). The memory device 76 may store one or more applications 71 (also referred to herein as application(s) 71). The application(s) 71 may include one or more computer instructions, software code, software instructions or the like. In an instance in which the application(s) 71 is executed by the processor 70, the application(s) 71 may automatically select and designate data (e.g., generated profile records, etc.) for indexing in a database(s) or memor(ies). The application(s) 71 may communicate the designated data to the index data source module 78, which may request a network device(s) to index the designated data, as described more fully below. The memory device 76 may also store data received from one or more network devices.

The apparatus 50 may, in one embodiment, be a mobile terminal (e.g., mobile terminal 10) or a fixed communication device or computing device configured to employ an example embodiment of the invention. However, in one embodiment, the apparatus 50 may be embodied as a chip or chip set. In other words, the apparatus 50 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus 50 may therefore, in some cases, be configured to implement an embodiment of the invention on a single chip or as a single "system on a chip." As such, in some cases, a chip or chipset may constitute means for performing one or more operations for providing the functionalities described herein. Additionally or alternatively, the chip or chipset may constitute means for enabling user interface navigation with respect to the functionalities and/or services described herein.

The processor 70 may be embodied in a number of different ways. For example, the processor 70 may be embodied as one or more of various processing means such as a coprocessor, microprocessor, a controller, a digital signal processor (DSP), processing circuitry with or without an accompanying DSP, or various other processing devices including integrated circuits such as, for example, an ASIC (application specific integrated circuit), an FPGA (field programmable gate array), a microcontroller unit (MCU), a hardware accelerator, a special-purpose computer chip, or the like. In an example embodiment, the processor 70 may be configured to execute instructions stored in the memory device 76 or otherwise accessible to the processor 70. As such, whether configured by hardware or software methods, or by a combination thereof, the processor 70 may represent an entity (e.g., physically embodied in circuitry) capable of performing operations according to an embodiment of the invention while configured accordingly. Thus, for example, when the processor 70 is embodied as an ASIC, FPGA or the like, the processor 70 may be specifically configured hardware for conducting the operations described herein. Alternatively, as another example, when the processor 70 is embodied as an executor of software instructions, the instructions may specifically configure the processor 70 to perform the algorithms and operations described herein when the instructions are executed. However, in some cases, the processor 70 may be a processor of a specific device (e.g., a mobile terminal or network device) adapted for employing an embodiment of the invention by further configuration of the processor 70 by instructions for performing the algorithms and operations described herein. The processor 70 may include, among other things, a clock, an arithmetic logic unit (ALU) and logic gates configured to support operation of the processor 70.

In an example embodiment, the processor 70 may be configured to operate a connectivity program, such as a browser, Web browser or the like. In this regard, the connectivity program may enable the apparatus 50 to transmit and receive Web content, such as for example location-based content or any other suitable content, according to a Wireless Application Protocol (WAP), for example.

Meanwhile, the communication interface 74 may be any means such as a device or circuitry embodied in either hardware, a computer program product, or a combination of hardware and software that is configured to receive and/or transmit data from/to a network and/or any other device or module in communication with the apparatus 50. In this regard, the communication interface 74 may include, for example, an antenna (or multiple antennas) and supporting hardware and/or software for enabling communications with a wireless communication network (e.g., network 30). In fixed environments, the communication interface 74 may alternatively or also support wired communication. As such, the communication interface 74 may include a communication modem and/or other hardware/software for supporting communication via cable, digital subscriber line (DSL), universal serial bus (USB), Ethernet or other mechanisms.

The user interface 67 may be in communication with the processor 70 to receive an indication of a user input at the user interface 67 and/or to provide an audible, visual, mechanical or other output to the user. As such, the user interface 67 may include, for example, a keyboard, a mouse, a joystick, a display, a touch screen, a microphone, a speaker, or other input/output mechanisms. In an example embodiment in which the apparatus is embodied as a server or some other network devices, the user interface 67 may be limited, remotely located, or eliminated. The processor 70 may comprise user interface circuitry configured to control at least some functions of one or more elements of the user interface, such as, for example, a speaker, ringer, microphone, display, and/or the like. The processor 70 and/or user interface circuitry comprising the processor 70 may be configured to control one or more functions of one or more elements of the user interface through computer program instructions (e.g., software and/or firmware) stored on a memory accessible to the processor 70 (e.g., memory device 76, and/or the like).

The index search module 72 may be any means such as a device or circuitry operating in accordance with software or otherwise embodied in hardware or a combination of hardware and software (for example, processor 70 operating under software control). In some other example embodiments, the index search module 72 may be a processor, coprocessor, controller, microprocessor or other processing element including integrated circuits (for example, embodied as an ASIC or FPGA) or circuitry configured to execute instructions, which may be stored in the memory device 76, or perform other logical functions or corresponding operations described herein. In an example embodiment, the index search module 72 may generate one or more search requests for data that may be sent to one or more devices (e.g., network device 90 of FIG. 3), as described more fully below. In response to receipt of the request(s), the device (e.g., a network device) may send the requested data to the index search module 72. The requested data may, but need not, be data that was previously requested by the index search module 78 to be indexed by the device (e.g., a network device (e.g., network device 90 of FIG. 3)), as described more fully below.

In an example embodiment, the processor 70 may be embodied as, include or otherwise control the index data source module. The index data source module 78 may be any means such as a device or circuitry operating in accordance with software or otherwise embodied in hardware or a combination of hardware and software (e.g., processor 70 operating under software control, the processor 70 embodied as an ASIC or FPGA specifically configured to perform the operations described herein, or a combination thereof) thereby configuring the device or circuitry to perform the corresponding functions of the index data source module 78, as described herein. Thus, in an example in which software is employed, a device or circuitry (e.g., the processor 70 in one example) executing the software forms the structure associated with such means.

The index data source module 78 may generate one or more requests for data to be indexed (e.g., in a database(s), memory or the like). In this regard, in response to receipt of an indication, by the index data source module 78, that a user of the apparatus 50 desires for designated or selected data (e.g., profile data, etc.) to be indexed, the index data source module 78 may send a message to a network device(s) (e.g., network device 90 of FIG. 3) to write a new index row(s) in one or more databases or memories. The new index row(s) to be may correspond to the data. In an example embodiment, the index data source module 78 may communicate with an application(s) (e.g., application 71) and may automatically send a message(s) including data (e.g., generated profile records, etc.) designated, by the application(s), for indexing to a network device(s) and may request the network device to write a new index row(s) for the designated data in one or more databases or memories.

Referring now to FIG. 3, a block diagram of an example embodiment of a network device for indexing data is provided. In an example embodiment, the network device may build or generate one or more indexes (e.g., distributed indexes, inverted indexes, etc.). In this regard, the network device 90 may generate one or more indexes for arranging data, content, information or the like. In an instance in which the data is indexed, the network device may retrieve the indexed data and may send the data to one or more other devices (e.g., apparatuses 50), as described more fully below. As shown in FIG. 3, the network device 90 (e.g., a server (e.g., communication device 25)) generally includes a processor 94 and an associated memory 96.

The memory 96 may comprise volatile and/or non-volatile memory. For example, the memory 96 may be an electronic storage device (for example, a computer readable storage medium) comprising gates configured to store data (for example, bits) that may be retrievable by a machine (for example, like processor 94). In some example embodiments, the memory 96 may be configured to store information, data, content, files, applications, instructions (e.g., computer instructions) or the like for enabling the network device 90 to carry out various functions in accordance with example embodiments of the invention. For instance, the memory 96 may store content, data, information, and/or the like transmitted from, and/or received by, the network device 90. Also for example, the memory 96 may store client applications, instructions, and/or the like for the processor 94 to perform the various operations of the network device in accordance with an embodiment of the invention, as described herein. In an example embodiment, the memory 96 may store indexed data. The memory 96 may optionally include one or more databases 91 (also referred to herein as database(s) 91). The database(s) 91 may store data, content, information or the like. For instance, in an example embodiment, the database(s) 91 may store all or some portion of indexed data.

In addition to the memory 96, the processor 94 may also be connected to at least one interface or other means for displaying, transmitting and/or receiving data, content, and/or the like. In this regard, the interface(s) may comprise at least one communication interface 98 or other means for transmitting and/or receiving data, content, and/or the like, as well as at least one user input interface 95. The user input interface 95, in turn, may comprise any of a number of devices allowing the network device to receive data from a user, such as a keypad, a touch display, a joystick or other input device. In this regard, the processor 94 may comprise user interface circuitry configured to control at least some functions of one or more elements of the user input interface. The processor and/or user interface circuitry of the processor may be configured to control one or more functions of one or more elements of the user interface through computer program instructions (e.g., software and/or firmware) stored on a memory accessible to the processor (e.g., volatile memory, non-volatile memory, and/or the like).

The processor 94 may be embodied in a number of different ways. For example, the processor 94 may be embodied as one or more of various processing means such as a coprocessor, microprocessor, a controller, a digital signal processor (DSP), processing circuitry with or without an accompanying DSP, or various other processing devices including integrated circuits such as, for example, an ASIC (application specific integrated circuit), an FPGA (field programmable gate array), a microcontroller unit (MCU), a hardware accelerator, a special-purpose computer chip, or the like. In an example embodiment, the processor 94 may be configured to execute instructions stored in the memory 96 or otherwise accessible to the processor 94. As such, whether configured by hardware or software methods, or by a combination thereof, the processor 94 may represent an entity (e.g., physically embodied in circuitry) capable of performing operations according to an embodiment of the invention while configured accordingly. Thus, for example, when the processor 94 is embodied as an ASIC, FPGA or the like, the processor 94 may be specifically configured hardware for conducting the operations described herein. Alternatively, as another example, when the processor 94 is embodied as an executor of software instructions, the instructions may specifically configure the processor 94 to perform the algorithms and operations described herein when the instructions are executed. However, in some cases, the processor 94 may be a processor of a specific device (e.g., a network device or a mobile terminal) adapted for employing an embodiment of the invention by further configuration of the processor 94 by instructions for performing the algorithms and operations described herein. The processor 94 may include, among other things, a clock, an arithmetic logic unit (ALU) and logic gates configured to support operation of the processor 94.

In an example embodiment, the processor 94 may be embodied as, include or otherwise control the application programming interface (API) 97. The API 97 may be any means such as a device or circuitry operating in accordance with software or otherwise embodied in hardware or a combination of hardware and software (e.g., processor 94 operating under software control, the processor 94 embodied as an ASIC or FPGA specifically configured to perform the operations described herein, or a combination thereof) thereby configuring the device or circuitry to perform the corresponding functions of the API 97, as described below. Thus, in an example in which software is employed, a device or circuitry (e.g., the processor 94 in one example) executing the software forms the structure associated with such means.

The API 97 may communicate with the index data source module 78 of the apparatus 50. In this regard, the API 97 may receive one or more requests from the index data source module 78 to index one or more items of data, as described more fully below. Additionally, the API 97 may communicate with the index search module 72 and may receive one or more requests to search data from the index search module 72 of an apparatus 50. In response to communicating with the index partition 99 and searching one or more partitions for the requested data, the API 97 may provide the requested data to the index search module 72. The requested data may, but need not, be indexed data.

In response to receipt of a request, for example, from the index data source module 78, to index one or more items of data, the API 97 may communicate with the order generator 93 and may obtain a requested order number from the order generator 93. The order number may be mapped, by the API 97, to a key value that may be assigned to the items of data requested to be indexed. In this regard, the requested items of data to be indexed and the corresponding key value may be linked by the API 97. As such, the API 97 may store the key value linked to the items of data to be indexed in the key/value store 92. The API 97 may store the requested items of data to be indexed with the linked key value in the key/value store 92 via one or more write index entries, as described more fully below. By enabling storage of the key value linked to the data to be indexed, the API 97 may enable the index builder 89 to find the corresponding data entries which may be utilized in an instance in which one or more indexes may need to be built and/or rebuilt. The key values and associated (e.g., linked) items of data for indexing may be part on a journal(s), which may include one or more journal entries. The journal entries may include one or more data operations, as described more fully below. One or more actions associated with the data operations may be performed by the index builder 89 and/or processor 70 during a build of an index or addition of an index row(s) to an existing index.

The key/value store 92 may be a storage unit or a memory device such as, for example, a volatile and/or non-volatile memory. The key/value store 92 may store one or more items of requested data to be indexed and one or more key values, order numbers or the like. In addition, the key/value store 92 may, but need not, store the indexed data and any other suitable data. The key/value store 92 may also provide a manner in which to enable the index builder 89 to build and/or rebuild one or more indexes based in part on one or more values of a key(s) and corresponding (e.g., linked) data.

The index builder 89 may be any means such as a device or circuitry operating in accordance with software or otherwise embodied in hardware or a combination of hardware and software (e.g., processor 94 operating under software control, the processor 94 embodied as an ASIC or FPGA specifically configured to perform the operations described herein, or a combination thereof) thereby configuring the device or circuitry to perform the corresponding functions of the index builder 89, as described below. Thus, in an example in which software is employed, a device or circuitry (e.g., the processor 94 in one example) executing the software forms the structure associated with such means. The index builder 89 may build or generate one or more indexes of data based in part on one or more items of data received from the index data source module 78. The items of data received from the index data source module 78 may be received in a request(s) or message(s), requesting the network device 90 to index the items of data.

The index builder 89 and/or the API 97 may request an order number from the order generator 93 and in response to receipt of the request, the order generator may respond by providing a next expected (e.g., sequential) order number (also referred to herein as order token) to the index builder 89 and/or the API 97. The index builder 89 may read one or more index entries (e.g., a newly stored index entry, for example by API 97) from the key/value store 92.

The partition is encoded in a journal key and although there is one index builder 89 shown in network device 90 of FIG. 3, there may be multiple index builders without departing from the spirit and scope of the invention. Each of the multiple index builders may handle the keys for a defined set of partitions. The number of rows of the data of a partition(s) may be based on the size of the data. In this regard, the index builder 89 may build an index(es) and may instruct the index partition 99 to add a row(s) to a set of rows for the selected/designated partition(s). It should be pointed out that the index builder 89 may read one or more index entries from the key/value store 92 based on a key value(s), which may be mapped to a corresponding order number(s) and one or more items of data to be indexed. The key value(s) may also be associated (e.g., linked) with one or more partition identifiers (IDs) and a number of rows of data corresponding to the order number. The partition ID(s) may be associated with a partition(s) that the index builder 89 is configured to utilize for indexing one or more items of data. In an instance in which the set of rows for a partition(s) reaches a predetermined size (e.g., the partition is full), the index builder 89 may write data to the key/value store 92 indicating that the partition(s) reached the predetermined size and may specify that the partition(s) is full.

The order generator 93 may be any means such as a device or circuitry operating in accordance with software or otherwise embodied in hardware or a combination of hardware and software (e.g., processor 94 operating under software control, the processor 94 embodied as an ASIC or FPGA specifically configured to perform the operations described herein, or a combination thereof) thereby configuring the device or circuitry to perform the corresponding functions of the order generator 93, as described herein. Thus, in an example in which software is employed, a device or circuitry (e.g., the processor 94 in one example) executing the software forms the structure associated with such means. The order generator 93 may receive a request from the API 97 for an order number to be utilized for an index entry by the API 97. In response to receipt of the request for the order number, the order generator 93 may request and obtain a corresponding order number from the index builder 89. In this regard, the order generator 93 may provide the order number, received from the index builder 89, to the API 97 to enable the API 97 to utilize the order number for writing one or more index entries relating to one or more items of data (e.g., data obtained from the index data source module 78) into the key/value store 92.

In one example embodiment, the index partition 99 may be a data structure that the index builder 89 writes to. In an alternative example embodiment, the index partition 99 may be any means such as a device or circuitry operating in accordance with software or otherwise embodied in hardware or a combination of hardware and software (e.g., processor 94 operating under software control, the processor 94 embodied as an ASIC or FPGA specifically configured to perform the operations described herein, or a combination thereof) thereby configuring the device or circuitry to perform the corresponding functions of the index partition 99, as described herein. Thus, in an example in which software is employed, a device or circuitry (e.g., the processor 94 in one example) executing the software forms the structure associated with such means. In an example embodiment, the index partition 99 may receive an instruction(s) from the index builder 89 to include or index one or more items of data in a specified/designated partition(s). In response to including or indexing the items of data in the specified partition(s), the index partition 99 may send a message to the index builder 89 indicating that the indexing of the items of data is complete. As such, the index builder 89 may provide a new entry to the key/value store 92 indicating that the indexing of the items of data is complete. The partitions of some example embodiments may be stored in the key/value data store 92, the memory 96, database(s) 91 or any other suitable memory device(s).

The index partition 99 may also receive a request from the API 97 to search one or more partitions for data. The API 97 may send the request to the index partition 99 requesting the search for the data in response to the API 97 receiving a message from the index search module 72 requesting the data.

In this regard, the API 97 may search one or more corresponding partitions to determine whether the data is stored and may determine whether the data is indexed.

In some example embodiments, the API 97 may determine that each of the partitions does not need to be searched for the data. The API 97 may determine that each of the partitions does not need to be searched for the data in an instance in which the API 97 knows the manner in which the data of the partitions is distributed and knows the partitions that the data should be distributed within. For purposes of illustration and not of limitation, the API 97 may determine that the index partition 99 only needs to search the first three out of ten partitions, for example, because the API 97 may know the manner in which the requested data is distributed among the partitions. As such, in this example, the API 97 may instruct the index partition 99 to search the first three partitions among the ten partitions for the requested data.

In some example embodiments, the API 97 may generate and send a message (e.g., a status Uniform Resource Locator (URL)) to the Index Data Source Module 78 indicating that the data has been received and stored, but not yet indexed. The index builder 89 may generate and send a message to the API 97 indicating that the data has been indexed.

Referring now to FIG. 4, an example embodiment of a system for indexing one or more items of data is provided. The system 7 may include one or more communication devices 165 and 167 (e.g., apparatuses 50 (e.g., mobile terminals 10)) as well as a network device 108 (e.g., network device 90). Although FIG. 4 shows one network device 108 and two communication devices 165, 167 it should be pointed out that any suitable number of network devices 108 and communication devices 165, 167 may be part of the system 7 without departing from the spirit and scope of the invention. In the example embodiment of FIG. 4, the communication device 165 and/or the communication device 167 may communicate (for example, via an index data source module 78) with the network device 108 and may request the network device 108 to index one or more items of data. The communication device 165 and/or the communication device 167 may send the data to be indexed to the network device 108. As such, the network device 108 (e.g., network device 90) may index the items of data in a manner analogous to that of the network device 90, as described herein.

In addition, in the example embodiment of FIG. 4, an index data source (e.g., index search module 72) of the communication device 165 and/or the communication device 167 may request the network device 108 to search one or more items of data to be sent to the communication device 165 and/or communication device 167. The items of data may have been previously sent to the network device 108 for indexing by the communication device 165 and/or the communication device 167. An API (e.g., API 97) of the network device 108 may search an index partition (e.g., index partition 99 (e.g., a data structure)) for the requested data among one or more partitions and the API may inform the communication device 165 and/or the communication device 167 as to whether the data is received, stored and/or indexed in a manner analogous to that described for the network device 90. In an instance in which the data is indexed, the network device 108 may send the data to the communication device 165 and/or communication device 167.

Referring now to FIG. 5, a diagram of a system for generating one or more indexes according to an example embodiment is provided. In the example embodiment of the system 9, the API 97 of a network device (e.g., network device 90) may communicate with the index data source module 78 of an apparatus (e.g., apparatus 50) and an index search module of an apparatus (e.g., apparatus 50). The API 97 may receive a request or message from the index data source module 78 to requesting the API 97 to index one or more items of data (e.g., profile data (for example, a name, address, telephone number, etc.) or any other suitable data)). In this regard, the index data source module 78 may request in the message that the API 97 write one or more new index rows corresponding to the data. (See block 1). The data that the index data source module 78 desires to be indexed may be included in the received message. In response to receipt of the message from the index data source module 78, the API 97 may request an order number from the order generator 93 for the requested index entry. (See block 2)

The order generator 93 may respond to a request for an order number from the index builder 89 (See block 3) and/or API 97 and in response to receiving the request for the order number, the order generator 93 may provide the order number to the requesting API 97 and/or the requesting index builder 89. In an example embodiment, the order generator 93 may determine a next sequential order number to provide to the requesting index builder 89 and/or the requesting API 97. In response to receipt of the order number from the order generator 93, the API 97 may map the order number to a key value and may link or associate the data, requested by the index data search module 78 to be indexed, to the key value. For instance, in one example embodiment, the order number may relate to one or more unique strings of characters (e.g., alphanumeric characters) or bytes of data. As such, the API 97 may utilize the unique strings of characters or bytes as a key value and may store the data that the index data source module 78 provided in association with (or linked to) the key value. The API 97 may provide or write the data received from the index data source module 78 to one or more index entries in the key/value store 92. (See block 4) In this manner, the data written to the one or more index entries in the key/value store 92 may be linked or associated with the key value.

In response to the API 97 writing the data to one or more index entries in the key/value store 92, the index builder 89 may analyze or read the data of the key/value store 92 and may read the index entries. (See block 5) In an example embodiment, the index builder 89 may read the most recently stored index entries. For example, the most recently stored index entry may be an index entry assigned the highest key value. In this example embodiment, the most recent index entries may relate to an index entr(ies) written to the key/value store 92 by the API 97 based on the data received from the index data source module 78.

The index builder 89 may examine the data associated with the read index entr(ies) and may determine the number of rows that the items of data correspond to in order to build or generate one or more index partitions. (See block 6) In some example embodiments, data may be streamed from a client (e.g., another apparatus 50, and/or index data source module 78) to the API 97 in order for the API 97 to include the streamed data into the key/value store 92. The streaming of the rows corresponding to the items of data (e.g., the data received from index data source module 78) associated with the read entr(ies) into one or more corresponding rows of a set of rows of a selected or designated partition(s) may continue until all, or a substantial portion, of the items of data are included (e.g., indexed) within the partition(s).

In an instance in which the set of rows for a selected or designated partition(s) reaches a predetermined size, the index builder 89 may provide or write data to the key/value store 92 indicating that the predetermined size for the partition(s) is reached. The indication that the predetermined size is reached may denote that the partition(s) is full.

It should be pointed out that in one example embodiment, a key value that the index builder 89 may read which may be associated with the read index entr(ies) is a function of a partition ID, an order number and a number of rows currently processed.

The API 97 may search one or more indexed partitions of the generated indexes built by the index builder 89. For instance, in response to receipt of a request from the index search module 72 of the apparatus 50, the index partition 99 may search one or more partitions for the requested data and in an instance in which the index partition 99 determines that the data is stored within one or more partitions, the index partition 99 may send the aggregated data of the one or more partitions to, via the API 97, the index search module 72. In one example embodiment, when the index partition 99 receives an indication from the index builder 89 that the index builder 89 reached the end of the data input for inclusion of data in one or more index rows in one or more selected or designated partition(s), the index partition 99 may return or provide, via the API 97, a message (e.g., a status URL) to the index search module 72. The message (e.g., a status URL) may be associated with information indicating that data requested for indexing is received and stored. Optionally, in response to the index builder 89 providing an indication to the index partition 99 that the data is indexed in the selected or designated partition(s), the index partition 99 may send a message (e.g., a URL) to the index search module 72 indicating that the data requested to be indexed is successfully indexed.

Referring now to FIG. 6, a diagram of a system for searching data according to an example embodiment is provided. In the example embodiment of the system 11, the API 97 of a network device (e.g., network device 90) may receive a message from the index search module 72 to search for data (for example, data designated as foo*). In response to receipt of the request, the API 97 may send a message to the index partition 99 instructing the index partition 99 to search the index partitions for the corresponding data (e.g., data designated as foo*). In response to the receipt of the message from the API 97 to search for the requested data, the index partition 99 may analyze all, or a portion, of the partitions for the requested data. In this regard, the index partition 99 may retrieve the requested data from one or more partitions and may aggregate the retrieved data. As such, the index partition 99 may send the aggregated data to the API 97. The API 97 may send the aggregated data to the index search module 72.

In some example embodiments, the API 97 may instruct the index partition 99 to search some of the partitions, as opposed to all of the partitions, for the requested data. For example, the API 97 may know the manner in which data is distributed among the partitions and may instruct the index partition 99 to search a subset of the partitions for the requested data (e.g., search the first three out of ten partitions, etc.).

Referring now to FIG. 7, a diagram of a system for indexing data according to an example embodiment is provided. In the example embodiment of the system 5 of FIG. 7, the index data source module 78 may send a message to the API 97 of a network device (e.g. network device 90) requesting the network device to index one or more items of data. In this regard, the message may include the items of data requested to be indexed. Additionally, the message may include data requesting the network device to write one or more new index rows in the key/value store 92 corresponding to the requested items of data. (See block 1) In the example of FIG. 7, for purposes of illustration and not of limitation, the data requested to be indexed may include a first name (fn), for example Matti, a phone number (e.g., 12345) and an identifier (id) (e.g., an id value of 24). It should be pointed out that the requested data may include any other suitable data.

In response to receipt of the request to write one or more index entries corresponding to the requested data into the key/value store 92, the API 78 may request an order number from the order generator 93. (See block 2) As such, the order generator 93 may send a request to the index builder 89 for the order number. In response to receipt of the request for the order number, the index builder 89 may analyze local data in a memory of the index builder 89 or information in the key/value store 92 to determine a next sequential order number for assigning to an index entry. (See block 3) In this example embodiment, the index builder 89 may determine that a previous order number (e.g., order number 6) was assigned for an index entry and that the next sequential order number for assigning to an index entry is order number 7. As such, the index builder 89 may provide the next sequential order number (e.g., order number 7) to the order generator 93, which may provide the order number to the API 97.

In response to receipt of the order number (e.g., order number 7), the API 97 may map the order number to a key value and link or associate the data requested for indexing, by the index data source module 78, to the key value. As such, the API 97 may write one or more index entries including the key value (e.g., key value 7) and the requested data 3 to the key/value store 92. (See block 4) In response to the writing of the index entry by the API 97 into the key/value store 92, the index builder 89 may analyze the data of the key/value store 92 and may identify the newly added index entry. In an example embodiment, the index builder 89 may continuously or periodically poll the key/value store 92 for the detection of newly written index entries. Upon detecting the key value (e.g., key value 7) associated with the newly written index entry, the index builder 89 may read the key value (e.g., key value 7) and the corresponding requested data 3 from the key/value store 92. (See block 5)

In response to reading the key value and the requested data, the index builder 89 may build one or more index partitions which may include the requested data 3. (See block 6) In an example embodiment, the index builder 89 may build the one or more index partitions by generating a new index row(s) including the requested data associated with the key value 7 in a partition(s). The partition(s) may be designated or selected by the index builder 89. In this regard, the index builder 89 may include the new index row 4 in a set of index rows 8 for a corresponding partition(s).

The key values and associated data of the key/value store 92 may be included in a journal 2. In this regard, the journal 2 may include a chronological record of data corresponding to one or more data operations (e.g., "Add", "Modify"). These data operations may be utilized by the index builder 89 to build one or more index partitions as well as for rebuilding the index partitions. Additionally, the index builder 89 may perform an action(s) associated with a data operation(s) in an instance in which the index builder 89 may index a row(s) to include corresponding data in a designated or selected partition(s). For purposes of illustration and not of limitation, in an instance in which the index builder 89 detected the key value 3, the index builder 89 may read the corresponding data (e.g., id 3, phone 345-252-1) and the data operation "Modify". In this regard, in an instance in which the index builder 89 built or generated the index row associated with the data of key value 3, the index builder 89 may modify the phone number of david associated with id 3 from 345252 to 345-252-1, as shown in FIG. 7.

In some alternative example embodiments, in an instance in which the API 97 may write data to the key/value store 92 for indexing an entry, the API 97 may include data specifying storage of more than one data operation per journal entry in a journal (e.g., journal 2). Enabling the key/value store 92 to store multiple data operations per journal entry instead of one data operation per journal entry may enable a network device (e.g., network device 90) to reduce a total number of journal entries of a journal.

Referring now to FIG. 8, a signal flow diagram for generating one or more indexes according to an example embodiment is provided. At operation 1, an index data source module 78 of an apparatus (e.g., apparatus 50) may send a message or request to an API 97 to add one or more index entries corresponding to requested data to be indexed. The index data source module 78 may provide the data requested to be indexed to the API 97 in the message. At operation 2, in response to receipt of the message from the index data source module 78, the API 97 may send a message to the order generator 93 requesting the order generator 93 to provide or get a next order number (no). The next order number may be a sequential order number since a previously used order number. Optionally, at operation 3, the order generator 93 may provide the requested order number to the API 97. Optionally, in an example embodiment, the order generator 93 may obtain the requested order number from the index builder 89.

At operation 4, the API 97 may write and enable storage of an index entry with a key value, corresponding, in part, to the order number and the requested data in the key/value store 92. Optionally, at operation 5, the key/value store 92 may send a message to the API 97 indicating that the index entry was written and that the key value and corresponding data was successfully (also referred to herein as "Ok") stored in the key/value store 92. Optionally, at operation 6, the API 97 may send a message to the index data source module 78 indicating that the data requested to be indexed is successfully stored. At operation 7, the index builder 89 may get the next order number (e.g., the next order number since a previous order number utilized by the index builder 89 for an index build) from the order generator 93. Optionally, the index builder 89 may obtain the next order number based on analyzing data of the key/value store 92.

In response to receipt of the request for the order number, the order generator 93 may provide the requested order number to the index builder 89. At operation 9, the index builder 89 may get or read one or more index entries from the key/value store 92. The one or more index entries obtained or read from the key/value store 92, by the index builder 89, may be one or more newly stored index entries. For example, the one or more index entries may correspond to the data requested by the index data source module 78. In an alternative example embodiment, the API 97 may inform the index builder 89 of new index entries stored in the key/value store 92. In this regard, the index builder 89 may not need to periodically poll the key/value store 92 to identify new index entries. Optionally, at operation 10, the key/value store 92 may provide the one or more index entries to the index builder 89. At operation 11, the index builder 89 may build or generate one or more index partitions in which the index builder 89 may generate a new index row into a set of index rows of a designated or selected partition(s). The new index row(s) may include the data requested to be indexed by the index data source module 78. In one example embodiment, the index builder 89 may partition index entries into multiple different index partitions. This may be based on an index row order number (for example, an index order number of 10 may denote to index the data among 10 partitions) or a consistent hash of index data or a row number. At operation 12, the index partition 99 may analyze the partitions and may send the index builder 89 a message indicating that the indexing of the designated or selected partition(s) is successful.

Referring now to FIG. 9, a signal flow diagram for searching data according to an example embodiment is provided. At operation 1, an index search module 72 of an apparatus (e.g., apparatus 50) may send a message or request to an API 97 to search for requested data. The message may include data requesting the API 97 to search one or more generated indexes for the requested data. The generated indexes may be previously built or created by the index builder 89. At operation 2, in response to receipt of the message, the API 97 may instruct the index partition 99 to search all, or a portion (e.g., a subset), of the partitions for the requested data.

Optionally, at operation 3, in response to receipt of the message from the API 97, the index partition 99 may search one or more partitions for the requested data. In an instance in which the index partition 99 identifies one or more items of the requested data in at least some of the partitions, the index partition 99 may aggregate the requested data and may send the requested data to the API 97. Optionally, at operation 4, the API 97 may provide the aggregated search results to the index search module 72 of an apparatus (e.g., apparatus 50).

Referring now to FIG. 10, a flowchart of an example method for generating one or more indexes of data is provided. At operation 1000, an apparatus (e.g., network device 90) may obtain an order number in response to receipt of a request from a device (e.g., apparatus 50) to index one or more items of data. At operation 1005, the apparatus (e.g., network device 90) may map the order number to a key value and may link the key value to the data (e.g., requested data).

At operation 1010, the apparatus (e.g., network device 90) may enable provision or write one or more index entries to a memory device (e.g., key/value store 92) to enable storage of the index entries. The one or more index entries may include information corresponding to the key value and the data. Optionally, at operation 1015, the apparatus (e.g., network device 90) may read one or more newly received index entries from the memory device (e.g., key/value store 92). The newly received index entries may correspond to the index entries written to the memory device in response to receipt of the request from the device (e.g., apparatus 50).

At operation 1020, the apparatus (e.g., network device 90) may assign at least one new index row including the data for inclusion in a set of index rows of at least one designated partition to obtain a built index of the data.

It should be pointed out that FIGS. 8-10 are flowcharts of a system, method and computer program product according to an example embodiment of the invention. It will be understood that each block of the flowcharts, and combinations of blocks in the flowcharts, can be implemented by various means, such as hardware, firmware, and/or a computer program product including one or more computer program instructions. For example, one or more of the procedures described above may be embodied by computer program instructions. In this regard, in an example embodiment, the computer program instructions which embody the procedures described above are stored by a memory device (e.g., memory device 76, memory 96, key/value store 92) and executed by a processor (e.g., processor 70, processor 94). As will be appreciated, any such computer program instructions may be loaded onto a computer or other programmable apparatus (e.g., hardware) to produce a machine, such that the instructions which execute on the computer or other programmable apparatus cause the functions specified in the flowcharts blocks to be implemented. In one embodiment, the computer program instructions are stored in a computer-readable memory that can direct a computer or other programmable apparatus to function in a particular manner, such that the instructions stored in the computer-readable memory produce an article of manufacture including instructions which implement the function(s) specified in the flowcharts blocks. The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowcharts blocks.

Accordingly, blocks of the flowcharts support combinations of means for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In an example embodiment, an apparatus for performing the methods of FIGS. 8-10 above may comprise a processor (e.g., the processor 70, the processor 94) configured to perform some or each of the operations (1-12), (1-4) and (1000-1020) described above. The processor may, for example, be configured to perform the operations (1-12), (1-4) and (1000-1020) by performing hardware implemented logical functions, executing stored instructions, or executing algorithms for performing each of the operations. Alternatively, the apparatus may comprise means for performing each of the operations described above. In this regard, according to an example embodiment, examples of means for performing operations (1-12), (1-4) and (1000-1020) may comprise, for example, the processor 70 (e.g., as means for performing any of the operations described above), the processor 94 and/or a device or circuitry for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
obtaining an order number in response to receipt of a request from a first device to index one or more items of data;
mapping the order number to a key value and linking the key value to the data;
enabling provision of one or more index entries to a memory device to enable storage of the index entries, the index entries comprising information corresponding to the key value and the data; and
assigning, via a processor, at least one new index row comprising the data for inclusion in a set of index rows of at least one designated partition to obtain at least one built index of the data.

2. The method of claim 1, wherein prior to assigning the at least one new index row, the method further comprises:
reading one or more newly stored index entries from the memory device.

3. The method of claim 2, wherein the newly stored index entries corresponds to the provided one or more index entries.

4. The method of claim 1, wherein obtaining the order number comprises receiving the order number in response to a request to a second device that determines a next sequence order number, which has not been assigned previously for an index build, as the order number.

5. The method of claim 1, wherein prior to the assigning the at least one new index row, the method further comprises:
enabling sending of a message to the first device indicating that the data is successfully received and stored.

6. The method of claim 1, wherein enabling provision comprises facilitating storage of the one or more provided index entries in a journal of the memory device, the journal comprising data indicating one or more data operations associated with items of information designated for indexing.

7. The method of claim 6, wherein at least a subset of the data operations are associated with the key value and the method further comprises:
performing one or more actions associated with the subset of the data operations during generation of the at least one built index of the data.

8. The method of claim 1, further comprising:
periodically reading the memory device to detect one or more newly received index entries associated with content for indexing; and
building one or more indexes for inclusion of the content by assigning at least one other new index row comprising the content, the other new index row included in at least one set of index rows of at least one selected partition.

9. The method of claim 1, wherein:
the designated partition comprises at least one memory storing one or more dedicated allocations of indexes and associated content of a predetermined size.

10. An apparatus comprising:
at least one processor; and
at least one memory including computer program code configured to, with the at least one processor, cause the apparatus to perform at least the following:
obtain an order number in response to receipt of a request from a first device to index one or more items of data;
map the order number to a key value and link the key value to the data;
enable provision of one or more index entries to a memory device to enable storage of the index entries, the index entries comprising information corresponding to the key value and the data; and
assign at least one new index row comprising the data for inclusion in a set of index rows of at least one designated partition to obtain at least one built index of the data.

11. The apparatus of claim 10, wherein prior to assign the at least one new index row, the memory and computer program code are configured to, with the processor, cause the apparatus to:

read one or more newly stored index entries from the memory device.

12. The apparatus of claim 11, wherein the newly stored index entries corresponds to the provided one or more index entries.

13. The apparatus of claim 10, wherein the memory and computer program code are configured to, with the processor, cause the apparatus to:
obtain the order number by receiving the order number in response to a request to a second device that determines a next sequence order number, which has not been assigned previously for an index build, as the order number.

14. The apparatus of claim 10, wherein prior to assign the at least one new index row, the memory and computer program code are configured to, with the processor, cause the apparatus to:
enable sending of a message to the first device indicating that the data is successfully received and stored.

15. The apparatus of claim 10, wherein the memory and computer program code are configured to, with the processor, cause the apparatus to:
enable provision by facilitating storage of the one or more provided index entries in a journal of the memory device, the journal comprising data indicating one or more data operations associated with items of information designated for indexing.

16. The apparatus of claim 15, wherein at least a subset of the data operations are associated with the key value, and the memory and computer program code are configured to, with the processor, cause the apparatus to:
perform one or more actions associated with the subset of the data operations during generation of the at least one built index of the data.

17. The apparatus of claim 10, wherein the memory and computer program code are configured to, with the processor, cause the apparatus to:
periodically read the memory device to detect one or more newly received index entries associated with content for indexing; and
build one or more indexes for inclusion of the content by assigning at least one other new index row comprising the content, the other new index row included in at least one set of index rows of at least one selected partition.

18. The apparatus of claim 10, wherein:
the designated partition comprises at least one memory storing one or more dedicated allocations of indexes and associated content of a predetermined size.

19. A computer program product comprising at least one non-transitory computer-readable storage medium having computer-readable program code portions stored therein, the computer-readable program code portions comprising:
program code instructions configured to obtain an order number in response to receipt of a request from a first device to index one or more items of data;
program code instructions configured to map the order number to a key value and link the key value to the data;
program code instructions configured to enable provision of one or more index entries to a memory device to enable storage of the index entries, the index entries comprising information corresponding to the key value and the data; and
program code instructions configured to assign at least one new index row comprising the data for inclusion in a set of index rows of at least one designated partition to obtain at least one built index of the data.

20. The computer program product of claim 19, wherein prior to assign the at least one new index row, the computer program product further comprising:
program code instructions configured to read one or more newly stored index entries from the memory device.

* * * * *